3,322,823
METHOD OF PREPARING CARBONYL FLUORIDE

Horst G. Langer, Cochituate, Mass., assignor to The Dow Chemical Company, Midland, Mich., a corporation of Delaware
No Drawing. Filed June 5, 1964, Ser. No. 373,069
5 Claims. (Cl. 260—544)

This invention relates to a novel method of preparing carbonyl fluoride from metal fluorine-containing salts and more particularly is concerned with a novel method for producing carbonyl fluoride by reacting calcium fluoride, carbon, and titanium dioxide.

The term "metal fluorine-containing salts" as used herein refers to both simple and complex fluorine-containing salts, the metal component of the simple salts being of the Group I-A and Group II-A metals of the Mendeleeff periodic chart.

It is the principal object of the present invention to provide a novel method of preparing carbonyl fluoride by a method which is simple, economical and which employs common, abundantly available raw materials.

Other objects and advantages will become apparent from the detailed description of the invention which follows.

Accordingly, the process of the present invention comprises the steps of, providing a reaction mixture of an inorganic metal fluorine-containing salt, for example, calcium fluoride, carbon, and an oxide which is reducible in the presence of carbon, such as, for instance, titanium dioxide and reacting this mixture in an inert gaseous atmosphere, such as argon or nitrogen at a minimum temperature sufficient to melt the reactants but below the boiling point of the reaction mass, thereby to form a carbonyl fluoride gaseous product. The carbonyl halogen so-formed is then collected and recovered.

In the present process, the reaction ordinarily is carried out at a temperature of from about 1500° C. to about 3500° C. Optimally, a temperature of from about 2800° C. to about 3500° C. is employed when reacting calcium fluoride, carbon and titanium dioxide, the preferred reactants. Such operative and optimum reaction temperatures as aforesaid may be obtained by use of, for example, an electric arm furnace, even though application of an electric potential and current through the reaction mixture is unnecessary in the present process. When using such a furnace normally a low potential of, for example, from about 5 to about 10 volts at from about 50 to about 100 amperes is first applied for about 15 to 30 minutes to accomplish melting of the mix. Thereafter, the full operating potential of approximately 40 volts at 200 amperes is applied to continue the reaction. Other sources of heat, of course, may also be employed. Reaction in the arc furnace, however, is the most convenient and is preferred.

The gaseous carbonyl halogen product is readily recovered by condensation as in a liquid nitrogen cooled trap, the gaseous product ordinarily being precooled by a trap series preceding the nitrogen trap comprising, for example, in sequence an air cooled column and reservoir (also used to recover or trap small amounts of unreacted mixture blown over from the reactor), a water cooled condenser and reservoir mainly used to precool said gaseous product, and a Dry Ice-acetone cooled column and container for further cooling of the gaseous product previous to its being condensed in the nitrogen cooled trap. The condensed carbonyl product so-recovered may either be placed in suitable pressure vessels at normal temperatures or in vessels at atmospheric pressure with cooling.

The inorganic fluorine-containing salt, carbon and the scavenging agent for use in the present invention are ordinarily reacted in molar proportions such to provide at least a 1 to 1 oxygen-to-fluorine ratio together with at least 1 mole of carbon per 2 moles of fluorine. Excess amounts of either the halogen salt or the reducible oxide do not react. Excess amounts of carbon, however, exceeding about 3 moles per 2 moles of fluorine should be avoided lest the carbonyl halogen product be reduced chemically. Substantially stoichiometric proportions are preferred.

In carrying out the present novel process in its preferred form, calcium fluoride is pulverized preferably to a particle size such that about 95 percent thereof is from 80 to 100 mesh (U.S. Standard Sieve Series) or otherwise finely divided. This is admixed in the aforesaid molar ratios with titanium dioxide and lampblack or graphite in an electric arc furnace crucible (anode), said furnace being equipped with a hood means and an inert gas inlet, the hood being connected to a liquid nitrogen cooled trap in which the carbonyl fluoride to be produced may be condensed and collected. The resulting mixture is then heated in said furnace in an argon atmosphere to the optimum reaction temperature as hereinbefore specified, whereupon, primarily carbonyl fluoride gas is generated (along with some other gases such as CO, $F_2$ and $CO_2$) according to the following equation:

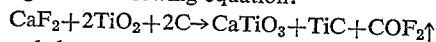

So-formed the gaseous carbonyl fluoride is then collected in the aforesaid liquid nitrogen trap comprising a flask jacketed by liquid nitrogen. The recovered carbonyl fluoride may then be purified, for example, by fractional distillation and absorption. If desired, the liquid nitrogen trap may be preceded by other traps such as for example, those described hereinbefore. The argon or other inert gas is used also as a carrier gas for the carbonyl fluoride gas formed.

Means may be provided to continuously feed a supply of the reaction mixture to the crucible replacing that involved in the reaction.

The metal inorganic fluorine-containing salts suitable for use in the present invention include both simple and complex fluorides, the metal cation component of the simple fluorides being a member of Groups I-A and II-A of the Mendeleeff periodic arrangement of the elements. Examples of suitable fluoride salts are calcium fluoride ($CaF_2$), sodium fluoride (NaF), potassium fluoride (KF), sodium fluoroaluminate ($Na_3AlF_6$), sodium fluorosilicate ($Na_2SiF_6$), fluoroapatite ($Ca_{10}(PO_4)_6F_2$), and the like. Calcium fluoride in the form of fluorspar, however, is preferred inasmuch as it is abundant, quite pure, and is naturally occurring.

Though carbon in lampblack form is preferred, particulate carbon in other forms is also usable.

The inorganic oxygen-containing scavenging agents for use in the present invention are materials which are reducible in the presence of carbon and reactive with the metal components of the fluorine salt. Examples of such typical scavenging agents are boron oxide ($B_2O_3$), zirconium oxide ($ZrO_2$), hafnium oxide ($HfO_2$), thorium oxide ($ThO_2$), manganese dioxide ($MnO_2$), titanium dioxide ($TiO_2$), lead oxide ($PbO_2$), borates such as potassium metaborate ($K_2B_2O_4$), potassium tetraborate ($K_2B_4O_7$), aluminum oxides such as alumina ($Al_2O_3$), beryllium aluminate ($BeAl_2O_4$), complex iron oxides such as iron aluminate ($FeAl_2O_4$), iron phosphate ($Fe_3P_2O_8$), ferrous metatitanate ($FeTiO_3$), Ilmenite ($FeO \cdot TiO_2$), and the like.

The following example serves to more fully illustrate the present invention, but is not intended to limit it thereto.

Example

About 78 grams of calcium fluoride together with about 36 grams of carbon as lampblack and about 80 grams of titanium dioxide were placed in a graphite crucible of an electric arc furnace, and an electric arc established therewith by means of a carbon cathode to melt the reaction mixture. An optimum reactive temperature of from about 2800° C. to about 3500° C. was employed, the maximum potential applied and reached during a 3 hour reaction period being about 40 volts at 200 amperes. A lower potential was initially applied, however, to first melt the reaction mixture. As the reaction proceeded, argon gas was passed through the furnace as a conveyance or sweep gas to carry the gaseous carbonyl fluoride product formed a colorless toxic gas, to a liquid nitrogen cooled reservoir where said carbonyl product condensed and was recovered. Approximately a 30 percent conversion of the original available fluorine was converted to carbonyl product at which point the reaction was stopped. It should be understood, however, that essentially a 100 percent conversion or yield of product may be obtained by extending the reaction period so as to completely consume the reactants and convert all the fluorine values in the melt to the carbonyl fluoride product.

Similar to the foregoing, the other fluorine salts specified hereinbefore may be reacted at an elevated temperature in an inert atmosphere in accordance with the present invention with one of the other scavenging agents also specified hereinbefore to prepare carbonyl fluoride therefrom.

The present invention may be modified or changed without departing from the spirit or scope thereof and it is understood that I limit myself only as defined in the appended claims.

I claim:

1. A method for preparing carbonyl fluoride which comprises, providing a reaction mixture of (1) an inorganic metal fluorine-containing salt from the group consisting of calcium fluoride, sodium fluoride, potassium fluoride, sodium fluoroaluminate, sodium fluorosilicate or fluoroapatite, (2) carbon, and (3) an oxygen-containing scavenging agent from the group consisting of boron oxide, zirconium oxide, hafnium oxide, thorium oxide, manganese dioxide, titanium dioxide, lead oxide, potassium metaborate, potassium tetraborate, aluminum oxide, beryllium aluminate, iron aluminate, iron phosphate, ferrous metatitanate, and Ilmenite, said meal fluorine-containing salt, carbon, and scavenging agent being reacted in molar proportions such to provide at least a 1 to 1 oxygen-to-fluorine ratio and at least a 1 to 2 carbon-to-fluorine ratio, reacting said mixture at a temperature sufficient to melt the reactants but below the boiling point of the reaction mass, thereby to form gaseous carbonyl fluoride therefrom, and recovering said gaseous carbonyl fluoride.

2. The method of claim 1 wherein the inorganic metal fluorine-containing salt, carbon, and said scavenging agent are reacted in substantially stoichiometric proportions.

3. The method of claim 1 wherein the reaction mixture is reacted at a temperature of from about 1500° C. to about 3500° C.

4. The method of claim 1 wherein the gaseous carbonyl fluoride is recovered by condensation.

5. The method of claim 1 wherein the metal fluorine-containing salt is fluorspar, the scavenging agent is titanium dioxide, and the reaction mixture is heated to a temperature of from about 2800° C. to about 3500° C., in an inert gaseous atmosphere to form gaseous carbonyl fluoride, recovering said carbonyl fluoride by condensation, and fractionally distilling the carbonyl fluoride so-condensed.

References Cited
UNITED STATES PATENTS

| | | | |
|---|---|---|---|
| 2,902,521 | 9/1959 | Cleaver et al. | 260—653.3 |
| 2,922,816 | 1/1960 | Bruce | 260—544 |

LORRAINE A. WEINBERGER, *Primary Examiner.*

RICHARD K. JACKSON, *Examiner.*